(No Model.)
T. A. EDISON.
ELECTRIC LAMP.
No. 251,543.   Patented Dec. 27, 1881.
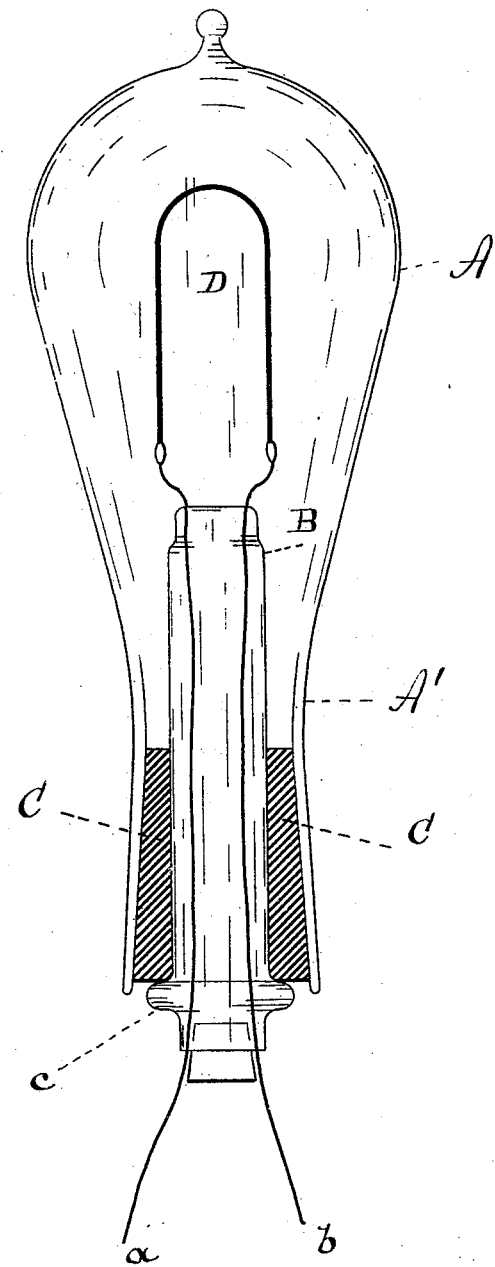
WITNESSES:  
D. D. Mott  
M. J. Clagett
INVENTOR:  
T. A. Edison  
BY Dyer & Wilber  
ATTORNEYS.

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

ELECTRIC LAMP.

SPECIFICATION forming part of Letters Patent No. 251,543, dated December 27, 1881.

Application filed August 30, 1881. (No model.)

*To all whom it may concern:*

Be it known that I, THOMAS A. EDISON, of Menlo Park, in the county of Middlesex and State of New Jersey, have invented a new and useful Improvement in Electric Lamps; and I do hereby declare that the following is a full and exact description of the same, reference being had to the accompanying drawings, and to the letters of reference marked thereon.

In Patent No. 239,372 is shown a lamp in which the glass wire-support is held in a tapering soft-rubber stopper forced in the neck of the globe. Now, it is my object to produce a simple lamp of this construction in which the wire-support cannot be forced by atmospheric pressure through the stopper into the globe, and the rubber stopper will be removed far enough from the light so that it will not be affected by heat conducted therefrom by the glass globe, and no mercury seal will be required to preserve an air-tight joint. A lamp of this construction is adapted to be taken apart when the carbon is destroyed, and all the parts except the carbon filament again utilized.

I construct the globe with a long neck, the lower end of which has a slight outward taper or flare. The glass wire-support is made tubular in form and of sufficient length to bring the carbon in the center of the globe. This tubular wire-support has its lower end enlarged or provided with a head or knob, which rests against the rubber stopper and prevents the forcing of the wire support into the globe by atmospheric pressure. The stopper is molded of pure, or nearly pure, rubber, in a polished mold, and has an exterior taper corresponding with that of the neck of the globe. The stopper has a central opening, in which the glass wire-support fits closely. The stopper carrying the wire-support is forced into the tapering neck, and the globe is then exhausted and sealed. The atmospheric pressure has a tendency to force the rubber stopper into the globe, and this pressure, on account of the taper of stopper and neck, serves to make the stopper close tight around the wire-support, and also to hug close to the surface of the globe-neck. At the same time the knob or enlargement prevents the wire-support being forced in too far, the length of the support being so proportioned that when the knob is forced against the base of the rubber stopper the carbon filament shall be in proper position within the globe. When the carbon is destroyed air is admitted to the lamp preferably by breaking off the sealing projection, and the stopper is then drawn out of the neck of the globe, carrying the wire-support with it. A new carbon filament is attached to the leading-in wires, the globe has a glass tube fused to its upper end over the perforation made by breaking off the sealing-projection, and the wire-support and stopper are again inserted in the globe, when the globe is exhausted and sealed. The neck of the globe is of such length that the heat conducted downwardly by the glass is mostly diffused into the air, and the glass in contact with the rubber is not heated sufficiently to affect the joint between the rubber and glass.

In the drawing the figure is a vertical section of an incandescing electric lamp constructed according to my present invention.

A is the glass globe, which is extended at A' to form a long neck, the lower end of which has an outward taper or flare. B is the long tubular glass wire-support, provided with an enlargement or knob, $c$, on its lower end. C is the tapering rubber stopper. D is the carbon filament, and $a\ b$ the leading-in wires.

What I claim is—

The combination of an inclosing-globe having a neck with outwardly-flaring sides, a perforated stopper with a correspondingly-shaped exterior, and a tubular wire-support provided at its lower end with a knob or enlargement, and fitting tightly within the perforation of the stopper, all adapted and arranged to maintain a tight joint and to determine the position of the carbon within the globe, substantially as set forth.

This specification signed and witnessed this 24th day of May, 1881.

THOS. A. EDISON.

Witnesses:
RICHD. N. DYER,
H. W. SEELY.